US012711086B2

(12) United States Patent
Li et al.

(10) Patent No.: US 12,711,086 B2
(45) Date of Patent: Aug. 18, 2026

(54) SYSTEM, METHOD, DEVICE, PROCESSOR, AND STORAGE MEDIUM THEREOF FOR IMPLEMENTING LARGE-SCALE FIFO DATA PROCESSING BASED ON DDR

(71) Applicant: TRANSCOM (SHANGHAI) TECHNOLOGY CO., LTD., Shanghai (CN)

(72) Inventors: Guangxing Li, Shanghai (CN); Weihao Shen, Shanghai (CN)

(73) Assignee: TRANSCOM (SHANGHAI) TECHNOLOGY CO., LTD., Shanghai (CN)

( * ) Notice: Subject to any disclaimer, the term of this patent is extended or adjusted under 35 U.S.C. 154(b) by 13 days.

(21) Appl. No.: 18/714,500

(22) PCT Filed: Jul. 21, 2022

(86) PCT No.: PCT/CN2022/106958
§ 371 (c)(1),
(2) Date: May 29, 2024

(87) PCT Pub. No.: WO2023/098099
PCT Pub. Date: Jun. 8, 2023

(65) Prior Publication Data

US 2025/0028663 A1 Jan. 23, 2025

(30) Foreign Application Priority Data

Nov. 30, 2021 (CN) ......................... 202111448215.6

(51) Int. Cl.
*G06F 13/28* (2006.01)
*G06F 12/0879* (2016.01)
(Continued)

(52) U.S. Cl.
CPC .......... *G06F 13/28* (2013.01); *G06F 13/1621* (2013.01); *G06F 13/1689* (2013.01)

(58) Field of Classification Search
CPC ... G06F 13/1621; G06F 13/1689; G06F 13/28
(Continued)

(56) References Cited

U.S. PATENT DOCUMENTS 5,568,443 A * 10/1996 Dixon ..................... G06F 5/065 365/189.05
2013/0042038 A1* 2/2013 Byrne .................. G06F 13/362 710/310

(Continued)

FOREIGN PATENT DOCUMENTS

CN 105468547 A 4/2002
CN 109412914 A 3/2019

(Continued)

*Primary Examiner* — Chun Kuan Lee
(74) *Attorney, Agent, or Firm* — MUNCY, GEISSLER, OLDS & LOWE

(57) ABSTRACT

The present invention relates to a system for implementing large-scale FIFO data processing based on DDR, comprises ingress asynchronous clock domain FIFO; burst read and write data block chain table, for writing data block chaining table and reading data block chaining table by setting of data bit width and data block length; DDR4 AXI interface for interacting with the flow control state machine and the burst read and write chain table; egress asynchronous clock domain FIFO; flow control state machine, used for data flow control to monitor writes and reads of data streams to the ingress asynchronous clock domain FIFO, DDR4 AXI interface and egress asynchronous clock domain FIFO. The present invention also relates to a method for implementing DDR-based large-scale FIFO data processing using DDR. By adopting the system, method, device, processor and its computer-readable storage medium for implementing large-scale FIFO data processing based on DDR of the present (Continued)

invention, the time utilization rate is improved, the data acquisition efficiency is effectively improved, and the FIFO storage depth is increased to ensure continuous data acquisition for a longer period of time.

12 Claims, 3 Drawing Sheets

(51) Int. Cl.
*G06F 12/0895* (2016.01)
*G06F 12/126* (2016.01)
*G06F 13/16* (2006.01)

(58) Field of Classification Search
USPC ........................................................ 710/22
See application file for complete search history.

(56) References Cited

U.S. PATENT DOCUMENTS

2014/0043343 A1* 2/2014 Iwai .......................... G06T 1/60
345/502
2016/0124889 A1 5/2016 Singh et al.
2016/0364290 A1* 12/2016 Geng ....................... G11C 7/10
2019/0294903 A1* 9/2019 Sun ........................... G06T 3/60

FOREIGN PATENT DOCUMENTS

CN 111262655 A 6/2020
CN 112948295 A 6/2021
CN 114090472 A 2/2022

* cited by examiner

SYSTEM, METHOD, DEVICE, PROCESSOR, AND STORAGE MEDIUM THEREOF FOR IMPLEMENTING LARGE-SCALE FIFO DATA PROCESSING BASED ON DDR

CROSS-REFERENCE TO RELATED APPLICATION

This application claims priority of Chinese Invention Patent Application No. 202111448215.6 filed Nov. 30, 2021, which is incorporated herein by reference.

FIELD OF TECHNOLOGY

The present invention relates to the field of wireless communication testing, in particular to the field of ultra-wideband wireless communication signal acquisition and analysis, specifically, it refers to a system, method, device, processor and computer-readable storage medium thereof for implementing large-scale FIFO data processing based on DDR.

DESCRIPTION OF RELATED ARTS

Wireless communication test generally involves vector analysis and protocol analysis, the signal analyzer has a certain length of time domain signal acquisition and storage capacity, so as to meet the subsequent signal analysis function. Wireless communications RF signal analyzer with mixing architecture that allows broadband RF signals to be frequency converted to lower frequencies such as IF or baseband, IF or analogue baseband signals are sampled by a high-speed ADC to form quantized data, which is transmitted to the FPGA via a high-speed data interface, which has a high clock speed and a continuous data stream, and needs to be cached by a device with a fast interface rate and a large storage capacity. FPGAs have limited internal storage space and generally require external DDR RAM for mass storage. In general, the high-speed quantized data clock is different from the DDR interface clock, and in the same case, the DDR interface clock is different from the data return interface clock. In order to realize data transmission across clock domains, asynchronous clock domain FIFOs are mostly used as the interface module for the logic of different clock domains. In order to collect data of a certain duration, it is common practice to cache the continuous quantized data to the DDR storage space via an asynchronous FIFO, and then initiate a return command to upload the data to the upper computer for subsequent processing once the storage is complete. The process of this method is clear, but the effective transmission time is large, the integrated bandwidth is not high, and the high-speed DDR interface bandwidth cannot be fully utilized, resulting in a long time-consuming data transmission.

Reasonable scheduling of write and read operations of DDR devices, making full use of the DDR interface bandwidth, can combine the two separate operation processes of caching and then reading to form a unified first-in-first-out (FIFO) operation mode, which can effectively reduce the operation time and greatly improve the data throughput rate.

SUMMARY OF THE INVENTION

It is an object of the present invention to overcome the drawbacks of the above-mentioned prior art, and to provide a system, method, device, processor and computer-readable storage medium thereof for implementing large-scale FIFO data processing based on DDR that meets the requirements of less operation time, high data throughput rate, and a wider scope of applicability.

In order to achieve the above objectives, the system, method, device, processor and computer-readable storage medium thereof of the present invention for implementing large-scale FIFO data processing based on DDR are as follows:

The system for implementing large-scale FIFO data processing based on DDR, the main feature of which is that the said system comprises:

- ingress asynchronous clock domain FIFO, with independent write clock and read clock, independently set write data bit width and read data bit width for data writing operation;
- burst read and write data block chain table, connected with the ingress asynchronous clock domain FIFO, for writing data block chaining table and reading data block chaining table by setting of data bit width and data block length;
- DDR4 AXI interface, connected with the burst read and write data block chain table, for interacting with the flow control state machine and the burst read and write chain table;
- egress asynchronous clock domain FIFO, connected with the burst read and write data block chain table, is used to have independent write clocks and read clocks, set the write data bit width and read data bit width settings independently for data output operations;
- flow control state machine, connected with the ingress asynchronous clock domain FIFO, DDR4 AXI interface, and egress asynchronous clock domain FIFO, used for data flow control to monitor writes and reads of data streams to the ingress asynchronous clock domain FIFO, DDR4 AXI interface and egress asynchronous clock domain FIFO.

Preferably, the data block chain table detects the number of operations of the ingress asynchronous clock domain FIFO and the egress asynchronous clock domain FIFO, counts and monitors the data writing and reading out of the DDR4 AXI interface, and carries out a data flow coherent operation under the control of a flow control state machine according to the read and write signal changes of the ingress asynchronous clock domain FIFO and the egress asynchronous clock domain FIFO.

Preferably, the operating modes of the system described are a transparency transport mode and a transit transport mode, the said transparency transport mode means that in the case of a short data duration and not exceeding the FIFO depths of the ingress asynchronous clock domain FIFO and the egress asynchronous clock domain FIFO, the data streams are directly passed through the ingress asynchronous clock domain FIFO and the egress asynchronous clock domain FIFO for the purpose of data transmission; the transit transport mode described refers to the transit of the data stream through the buffer space of the DDR4 AXI interface in the event that the continuous data duration is long and exceeds the threshold value ingress asynchronous clock domain FIFO and egress asynchronous clock-domain FIFO of FIFO depth.

Preferably, the said system has a read bandwidth of the egress asynchronous clock domain FIFO in the transparency transport mode that is greater than the write bandwidth of the ingress asynchronous clock domain FIFO.

The method for realizing large-scale FIFO data processing using the system described above, the main feature of which is that said method comprises the following steps:

(1) power-on reset, ingress asynchronous clock domain FIFO writes data;

(2) determine whether the written data is greater than the threshold value, if so, the working mode turns to transit transport mode, turning on DDR4 access and using DDR4 as cache space for read and write operations; otherwise, the working mode turns to transparency transport mode.

Preferably, the method comprises the step of implementing a FIFO read and write operation through a transit transport mode, specifically comprises the following processing:

(1-1) the DDR4 AXI interface performs burst accesses using the data block as the unit of operation to obtain the monitoring variables for the data block count value and the number of ingress FIFO data reads;

(1-2) the ingress asynchronous clock domain FIFO acquires a full length block of data;

(1-3) if the write bus of the DDR4 AXI interface is in the READY state, a write enable is issued and the internal count value is updated; if the read bus of the DDR4 AXI interface is in the READY state, a read enable is issued, the summarized data is passed to the egress asynchronous clock domain FIFO, and the internal count value is updated.

Preferably, the method comprises the step of implementing a FIFO read and write operation through a transparency transport mode, specifically comprises the following processing:

(2-1) power-on reset, the empty signal of the ingress asynchronous clock domain FIFO is high and the full signal of the egress asynchronous clock domain FIFO is low;

(2-2) write data, the empty signal of the ingress asynchronous clock domain FIFO is low, and according to the timing jump formula, the read enable of the ingress asynchronous clock domain FIFO is obtained as high;

(2-3) counts the number of data reads from the ingress asynchronous clock domain FIFO, and if the number of reads exceeds the threshold value, the mode signal automatically jumps to transit mode; otherwise, it continues to transparency transport mode, and continues with step (4);

(2-4) data is read from the ingress asynchronous clock domain FIFO and written to the egress asynchronous clock domain FIFO, and the egress asynchronous clock domain FIFO write enable signal performs a timing jump according to equation;

(2-5) determine whether the ingress asynchronous clock domain FIFO is read empty or the egress asynchronous clock domain FIFO is written full; if so, no further operation is performed on the FIFO and the step is exited; otherwise, read and write operations continue to be performed on the FIFO.

Preferably, the effective signal of the ingress asynchronous clock domain FIFO in said step (4) is delayed by one clock according to the state of the read enable signal of the ingress asynchronous clock domain FIFO and the acquired signal of the ingress asynchronous clock domain FIFO before jumping.

The device for implementing large-scale FIFO data processing based on DDR, the main feature of which is that said device comprises:

processor, configured to execute computer-executable instructions;

memory, storing one or more computer-executable instructions, when the said computer-executable instructions are executed by the said processor, various steps of the above-described method of implementing large-scale FIFO data processing.

The processor for implementing large-scale FIFO data processing based on DDR, the main feature that the processor being configured to execute computer-executable instructions, when the said processor being configured to execute computer-executable instructions, various steps of the above-described method of implementing large-scale FIFO data processing.

The computer-readable storage medium, the main feature of which is that a computer program stored on it, the said computer program may be executed by a processor to implement the various steps of the above-described method of implementing large-scale FIFO data processing.

The system, method, device, processor, and computer-readable storage medium thereof for implementing large-scale FIFO data processing based on DDR mentioned in this invention, taking advantage of the ultra-high bandwidth and high-capacity capability provided by hardware DDR4 RAM, the Round-Robin scheduling algorithm is used to implement FIFO internal stream caching, which improves time utilization, it solves the time-consuming problem of traditional temporary storage and then reading back, effectively improves the data collection efficiency, and increases the FIFO storage depth to ensure a longer period of continuous data collection. This invention has a large-capacity and high-bandwidth DDR4 RAM cache to design a standard interface depth FIFO, to achieve the modularity of the functional unit, which can be flexibly transplanted to the scene that requires long-time data acquisition, and to meet the modularity design requirements of the system.

DETAILED DESCRIPTION OF THE PREFERRED EMBODIMENT

Figure 1:
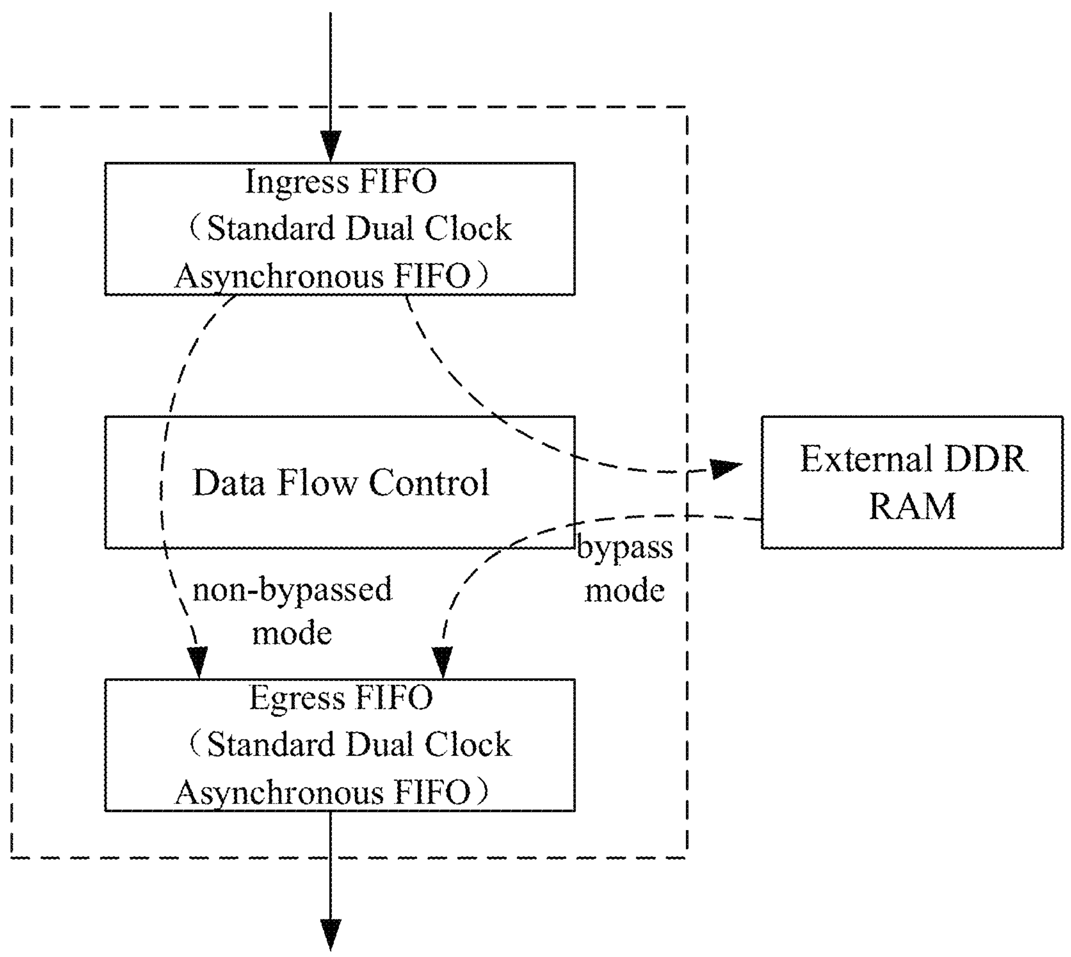
FIG. 1 shows a conceptual block diagram of the DDR-based system of the present invention for implementing large-scale FIFO data processing.

In order to be able to understand the technical content of the present invention more clearly, is further exemplified by the following detailed description of embodiments.

The system for implementing large-scale FIFO data processing based on DDR of the present invention, wherein comprises:

ingress asynchronous clock domain FIFO, with independent write clock and read clock, independently set write data bit width and read data bit width for data writing operation;

burst read and write data block chain table, connected with the ingress asynchronous clock domain FIFO, for writing data block chaining table and reading data block chaining table by setting of data bit width and data block length;

- DDR4 AXI interface, connected with the burst read and write data block chain table, for interacting with the flow control state machine and the burst read and write chain table;
- egress asynchronous clock domain FIFO, connected with the burst read and write data block chain table, is used to have independent write clocks and read clocks, set the write data bit width and read data bit width settings independently for data output operations;
- flow control state machine, connected with the ingress asynchronous clock domain FIFO, DDR4 AXI interface, and egress asynchronous clock domain FIFO, used for data flow control to monitor writes and reads of data streams to the ingress asynchronous clock domain FIFO, DDR4 AXI interface and egress asynchronous clock domain FIFO.

As a preferred embodiment of the present invention, the data block chain table detects the number of operations of the ingress asynchronous clock domain FIFO and the egress asynchronous clock domain FIFO, counts and monitors the data writing and reading out of the DDR4 AXI interface, and carries out a data flow coherent operation under the control of a flow control state machine according to the read and write signal changes of the ingress asynchronous clock domain FIFO and the egress asynchronous clock domain FIFO.

As a preferred embodiment of the present invention, the operating modes of the system described are a transparency transport mode and a transit transport mode, the said transparency transport mode means that in the case of a short data duration and not exceeding the FIFO depths of the ingress asynchronous clock domain FIFO and the egress asynchronous clock domain FIFO, the data streams are directly passed through the ingress asynchronous clock domain FIFO and the egress asynchronous clock domain FIFO for the purpose of data transmission; the transit transport mode described refers to the transit of the data stream through the buffer space of the DDR4 AXI interface in the event that the continuous data duration is long and exceeds the threshold value ingress asynchronous clock domain FIFO and egress asynchronous clock-domain FIFO of FIFO depth.

As a preferred embodiment of the present invention, the said system has a read bandwidth of the egress asynchronous clock domain FIFO in the transparency transport mode that is greater than the write bandwidth of the ingress asynchronous clock domain FIFO.

The method of implementing large-scale FIFO data processing based on DDR using the system, wherein comprises the following steps:

- (1) power-on reset, ingress asynchronous clock domain FIFO writes data;
- (2) determine whether the written data is greater than the threshold value, if so, the working mode turns to transit transport mode, turning on DDR4 access and using DDR4 as cache space for read and write operations; otherwise, the working mode turns to transparency transport mode.

As a preferred embodiment of the present invention, the method comprises the step of implementing a FIFO read and write operation through a transit transport mode, specifically comprises the following processing:

- (1-1) the DDR4 AXI interface performs burst accesses using the data block as the unit of operation to obtain the monitoring variables for the data block count value and the number of ingress FIFO data reads;
- (1-2) the ingress asynchronous clock domain FIFO acquires a full length block of data;
- (1-3) if the write bus of the DDR4 AXI interface is in the READY state, a write enable is issued and the internal count value is updated; if the read bus of the DDR4 AXI interface is in the READY state, a read enable is issued, the summarized data is passed to the egress asynchronous clock domain FIFO, and the internal count value is updated.

As a preferred embodiment of the present invention, the method comprises the step of implementing a FIFO read and write operation through a transparency transport mode, specifically comprises the following processing:

- (2-1) power-on reset, the empty signal of the ingress asynchronous clock domain FIFO is high and the full signal of the egress asynchronous clock domain FIFO is low;
- (2-2) write data, the empty signal of the ingress asynchronous clock domain FIFO is low, and according to the timing jump formula, the read enable of the ingress asynchronous clock domain FIFO is obtained as high;
- (2-3) counts the number of data reads from the ingress asynchronous clock domain FIFO, and if the number of reads exceeds the threshold value, the mode signal automatically jumps to transit mode; otherwise, it continues to transparency transport mode, and continues with step (4);
- (2-4) data is read from the ingress asynchronous clock domain FIFO and written to the egress asynchronous clock domain FIFO, and the egress asynchronous clock domain FIFO write enable signal performs a timing jump according to equation;
- (2-5) determine whether the ingress asynchronous clock domain FIFO is read empty or the egress asynchronous clock domain FIFO is written full; if so, no further operation is performed on the FIFO and the step is exited; otherwise, read and write operations continue to be performed on the FIFO.

As a preferred embodiment of the present invention, the effective signal of the ingress asynchronous clock domain FIFO in said step (4) is delayed by one clock according to the state of the read enable signal of the ingress asynchronous clock domain FIFO and the acquired signal of the ingress asynchronous clock domain FIFO before jumping.

The device for implementing large-scale FIFO data processing based on DDR of the present invention, wherein the device comprises:

- processor, configured to execute computer-executable instructions;
- memory, storing one or more computer-executable instructions, when the said computer-executable instructions are executed by the said processor, various steps of the above-described method of implementing large-scale FIFO data processing.

The processor for implementing large-scale FIFO data processing based on DDR of the present invention, wherein the processor being configured to execute computer-executable instructions, when the said processor being configured to execute computer-executable instructions, various steps of the above-described method of implementing large-scale FIFO data processing.

The computer-readable storage medium of the present invention, that a computer program stored on it, the said computer program may be executed by a processor to implement the various steps of the above-described method of implementing large-scale FIFO data processing.

The present invention presents a method and FPGA logic implementation of a standard FIFO using high-speed DDR4 as cache space, The present invention makes full use of the high bandwidth and large storage space of the DDR4 interface, and reasonably designs a data flow control and scheduling controller, using Round-Robin scheduling method, write and read operations are merged to achieve an interface-standard ultra-large depth FIFO, which effectively solves the problem of continuous reading of large-length time-domain data.

Figure 3:
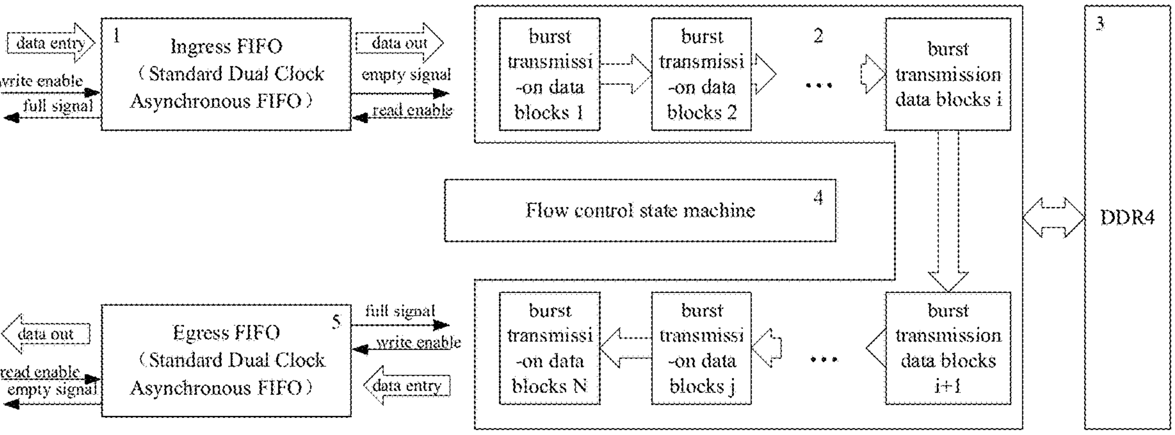
FIG. 3 shows a block diagram of bypass mode FIFO implementation logic of the method of the present invention for implementing DDR-based large-scale FIFO data processing using DDR.

The present invention presents a method and FPGA logic implementation of a standard FIFO using high-speed DDR4 as cache space, the technical solution is to make full use of the characteristics of DDR4 interface with high bandwidth and large storage space, reasonably design the data flow control and scheduling controller, and adopt the Round-Robin scheduling method to merge the write and read operations, so as to realize a kind of interface-standard ultra-large-depth FIFO, which is used to effectively solve the problem of continuous reading of data with a large time duration. The functional structure of the scheme is shown in FIG. 3, which consists of five main parts, namely, the ingress asynchronous clock domain FIFO, the burst read and write data block chain table, the high-speed DDR4 AXI interface, the flow control state machine and the egress asynchronous clock domain FIFO. The scheme can be further divided into three clock domains according to clock domains: the ingress write clock domain, the DDR4 clock domain, and the egress read clock domain.

The structure of the invention is described according to the different functional units:

Ingress asynchronous clock domain FIFO: implemented using a standard FIFO IP core with independent write and read clocks, with independent write data bitwidth and read data bitwidth settings. This FIFO implements a standardized interface, simplifying the complexity of the user's logical operations and reinforcing the modularity and standardization of the solution of the invention.

Burst read and write data block chain table: to match the data characteristics of the DDR4 AXI4 interface, a write data block chain table and a read data block chain table are designed using a setting that matches the data bit width and data block length. The chain table has a counting monitoring variable, while detecting the number of operations of the entrance FIFOs, and at the same time counting and monitoring the data writing and reading out of the DDR4 AXI4 interface, according to the read and write signal changes of the entrance and exit FIFOs, the data flow is operated coherently under the control of the flow control state machine, avoiding the situation of overflow or breakpoints, and realizing the correct writing and reading of the data.

DDR4 AXI interface: implemented using the standard DDR4 AXI4 IP core, it ensures proper interaction with the flow control state machine and the burst read and write chain table.

Flow control state machine: implement data flow control to ensure that data is written and read without overflow or breakpoints. This state machine continuously monitors the ingress FIFO empty signal, the number of ingress FIFO reads, the DDR4 writable state, the number of DDR4 writes, the DDR4 readable state, the number of DDR4 reads, the number of egress FIFO writes, and the egress FIFO full signal, to achieve Round-Robin scheduling policy for data stream writes and reads to ensure data coherence and improve DDR4 interface bandwidth utilization.

Egress asynchronous clock domain FIFO: implemented using a standard FIFO IP core with independent write and read clocks, with independent write data bitwidth and read data bitwidth settings. This FIFO implements a standardized interface, simplifying the complexity of the user's logical operations and reinforcing the modularity and standardization of the solution of the invention.

The deep FIFO implemented using DDR proposed in the present invention has two modes of operation, a transparency transport mode and a transit transport mode. The transparency transport mode means that when the data duration is short and does not exceed a certain threshold value (not exceeding the depth of the ingress and egress FIFOs), the data stream does not go through the DDR4 buffer space transit, and the data transmission is carried out directly through the ingress FIFOs and the egress FIFOs, with the minimum overall transmission latency, but there are requirements for the consecutive data durations. The transit mode means that when the continuous data length is long and exceeds the threshold value (depth of the ingress and egress FIFOs), the data stream is transited through the DDR4 buffer space to ensure that the long-time continuous data does not overflow and does not break. This mode is suitable for continuous long-time data transmission, but the delay is large.

Figure 2:
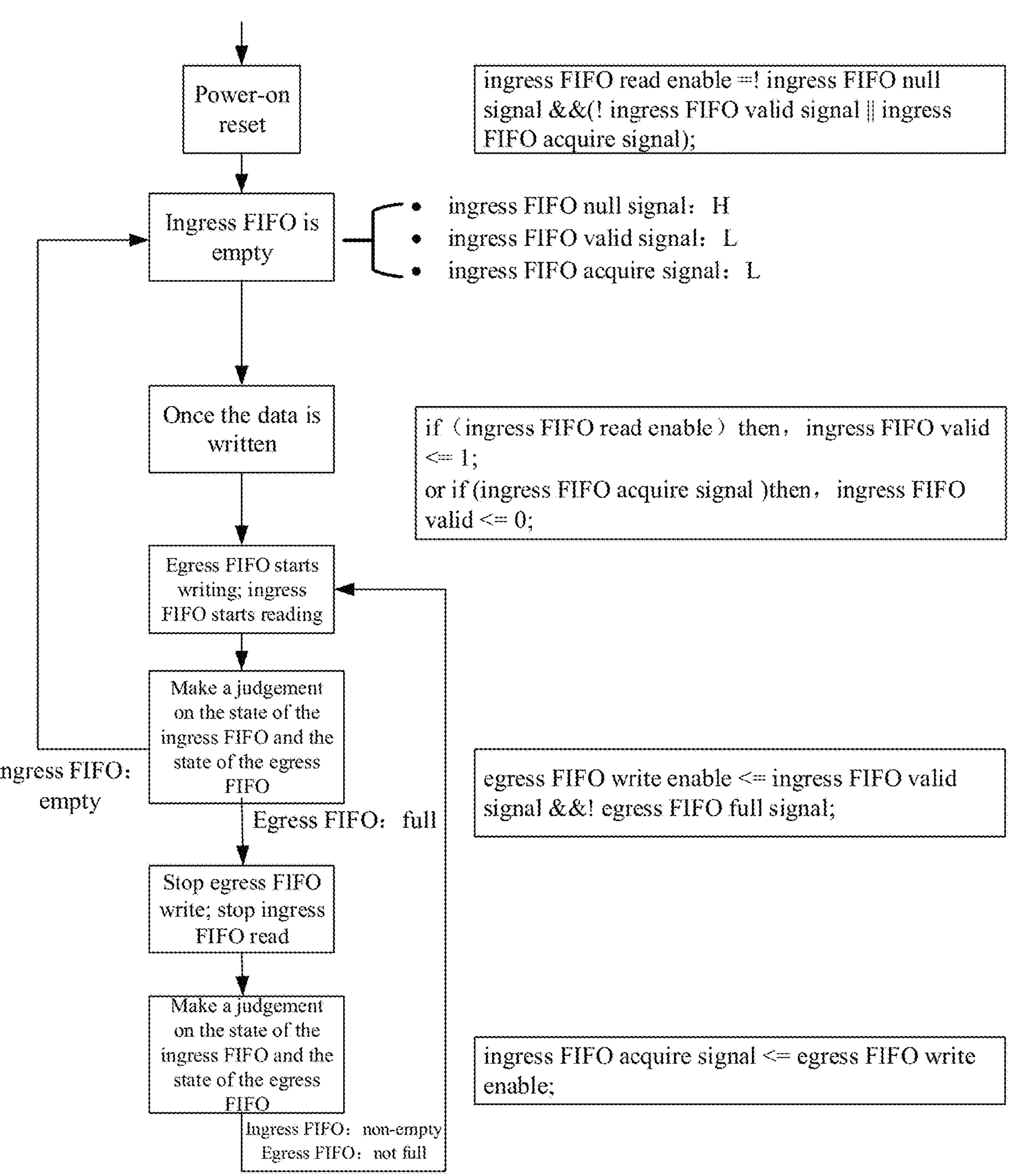
FIG. 2 shows a transparency transport mode FIFO read/write flow of the method of the present invention for implementing DDR-based large-scale FIFO data processing using DDR.

As shown in FIG. 2, the transparency transport mode works as follows:

1. when power-on reset, the ingress FIFO empty signal is high and the egress FIFO full signal is low.

2. once the data is written, the ingress FIFO empty signal is low, according to the timing jump formula (combinational logic) "ingress FIFO read enable=! ingress FIFO null signal &&(! ingress FIFO valid signal||ingress FIFO acquire signal)" derives the ingress FIFO read enable as high. where both the ingress FIFO valid signal and the ingress FIFO acquire signal are low after power-on reset.

3. start counting the number of read-outs of the ingress FIFO data as the basis for mode jumping, if the number of read-outs exceeds the threshold value, the mode signal automatically jumps to the transit mode.

4. the data in the ingress FIFO is read out and then written to the egress FIFO. The egress FIFO write enable signal is based on the formula "egress FIFO write enable<=ingress FIFO valid signal &&! egress FIFO full signal;" a timing jump is performed, wherein the 【ingress FIFO valid signal】 is delayed by one clock jump according to the state of the 【ingress FIFO read enable signal】 and the 【ingress FIFO acquire signal】. The pseudo-code is as follows:

```
if (ingress FIFO read enable signal)
ingress FIFO valid signal<= 1;
else if (ingress FIFO acquire signal)
ingress FIFO valid signal<= 0;
```

5. once the ingress FIFO is read empty, or the write FIFO is written full, 【ingress FIFO read enable】 and 【egress FIFO write enable】 will jump low, and no further operation will be performed on the FIFO.

6. in order to ensure that the write data does not overflow, it is necessary that the read bandwidth of the egress FIFO is greater than the write bandwidth of the ingress FIFO.

In the specific embodiments of the invention, emphasis is placed on the realization of deep FIFO in the transit mode. A number of variables, and timing jump formulas for the variables, are first defined. The core semaphore definitions, timing formulas, and descriptions are shown in Table 1.

TABLE 1

| Variable Name | Meaning Name | Explanation | Timing Formulas |
|---|---|---|---|
| bursts_allocated | number of burst transmission data blocks | records the current number of burst transmission data blocks that still need to be operated, is a self-modifying variable that depends on historical and current operational values. | bursts_allocated <= bursts_allocated + do_to_ram_burst − from_ram_last; |
| min_pre_rd_count | amount of data written to RAM | records the amount of data that has been read from the ingress FIFO and written to DDR RAM. | min_pre_rd_count <= min_pre_rd_count + to_ram_increase − beat_to_ram; |
| do_to_ram_burst | burst write operation enable signal to RAM | preparing for a burst write operation to RAM. The status depends on the DDR4 AXI writable state, the amount of data that has been read out of the ingress FIFO, and the amount of data in the data block chain table | do_to_ram_burst = ! axi_awvalid & & !bypass_mode & & (fifo_pre_rd_count >= min_pre_rd_count) & & (bursts_allocated < bursts_in_ram); where bursts_in_ram is a constant that depends on constant information such as DDR4 capacity and AXI4 interface burst transfer length. |
| max_post_wr_count | amount of RAM data read | record the amount of data that has been read out of DDR RAM and written to the egress FIFOs | max_post_wr_count <= max_post_wr_count + beat_from_ram − from_ram_decrease; |
| do_from_ram_burst | burst read operation enable signal for RAM. | preparing for a burst read operation to RAM. The status depends on the readable state of the DDR4 AXI, the amount of data that has been written to the egress FIFO, and the amount of data in the data block chain table | do_from_ram_burst <= !axi_arvalid & & !bypass_mode & & (fifo_post_wr_count <= max_post_wr_count) & & ! max_post_wr_count[log2_fifo_words + 1] & & (bursts_stored! = 0); |

The operating modes of the transit transport mode are as follows:

1. when power-on reset, ingress FIFO can write data.
2. when the write data is greater than the threshold value, the mode jumps to transit transport mode, i.e., DDR4 access is turned on, and read and write operations are performed using DDR4 as cache space.
3. the DDR4 AXI4 interface performs burst accesses with data blocks as the unit of operation. The data block size has two parameters, the data bit width and the data length. The data in the ingress FIFO has to be read out and rounded up to a data block before it can be written to the DDR4, so it is necessary to have monitoring variables such as the data block count value and the number of data read out of the ingress FIFO.
4. after a full block length of data has been fetched from the ingress FIFO, when the AXI4 bus is in the READY state, a write enable is issued and the internal count value is updated.

When the AXI4 read bus is in READY, a read enable is issued and gauge data is passed to the egress FIFO and the internal count value is updated.

Specific embodiments of this embodiment can be found in the relevant descriptions in the above embodiments and will not be repeated here.

It is to be understood that the same or similar portions of the above embodiments may be cross-referenced, and what is not described in detail in some embodiments may be seen as the same or similar in other embodiments.

It should be noted that in the description of the present invention, the terms “first”, “second”, etc. are used for descriptive purposes only and are not to be understood as indicating or implying relative importance. Furthermore, in the description of the present invention, unless otherwise indicated, “plurality” means at least two.

Any process or method description depicted in the flowchart or otherwise described herein may be understood to represent a module, fragment, or portion of code comprising one or more executable instructions for implementing the steps of a particular logical function or process, and that the scope of the preferred embodiments of the present invention includes additional implementations, which may be, in no particular order as shown or discussed, including performing functions in a substantially simultaneous manner or in reverse order, according to the functions involved, should be understood by those skilled in the art to which embodiments of the present invention belong.

It should be understood that various parts of the invention may be implemented with hardware, software, firmware, or combinations thereof. In the above embodiments, a plurality of steps or methods may be implemented with software or firmware stored in memory and executed by a suitable instruction execution device. For example, if implemented in hardware, as in another embodiment, it may be implemented with any of the following techniques known in the art or combinations thereof: discrete logic circuits having logic gates for implementing logic functions on data signals, special-purpose integrated circuits having suitably combinational logic gates, programmable gate arrays (PGA), field-programmable gate arrays (FPGA), and the like.

One of ordinary skill in the art can appreciate that all or some of the steps carried out to realize the method of the above embodiments can be accomplished by instructing the associated hardware by means of a program, which can be stored in a computer-readable storage medium that, when executed, comprises one of the steps of the method embodiments or a combination thereof.

Furthermore, the functional units in various embodiments of the present invention may be integrated in a single processing module, or the individual units may be physically present separately, or two or more units may be integrated in a single module. The integrated modules described above may be implemented either in the form of hardware or in the form of software function modules. The integrated modules may also be stored in a computer-readable storage medium if they are implemented as software function modules and sold or used as stand-alone products.

The storage media mentioned above may be read-only memories, disks or CD, etc.

In the description of this specification, reference to the terms "an embodiment", "some embodiments", "example", "specific example", or "embodiment" means that a specific feature, structure, material, or characteristic described in conjunction with the embodiment or example is included in at least one embodiment or example of the present invention. In this specification, schematic representations of the above terms do not necessarily refer to the same embodiments or

We claim:

1. A system for implementing large-scale FIFO data processing based on DDR, the system comprising:

an ingress asynchronous clock domain FIFO, with independent write clocks and read clocks, independently setting a write data bit width and a read data bit width for data writing operations;

a burst read and write data block chain table, connected with the ingress asynchronous clock domain FIFO, for writing a data block chaining table and reading the data block chaining table by setting of the data bit width and the data block length;

a DDR4 AXI interface, connected with the burst read and write data block chain table, for interacting with a flow control state machine and the burst read and write data block chain table;

an egress asynchronous clock domain FIFO, connected with the burst read and write data block chain table, with independent write clocks and read clocks, setting the write data bit width and read data bit width settings independently for data output operations; and the flow control state machine, connected with the ingress asynchronous clock domain FIFO, the DDR4 AXI interface, and the egress asynchronous clock domain FIFO, used for data flow control to monitor writes and reads of data streams to the ingress asynchronous clock domain FIFO, the DDR4 AXI interface and the egress asynchronous clock domain FIFO, wherein the burst read and write data block chain table includes a counting monitoring variable to detect the number of operations of the ingress asynchronous clock domain FIFO and the egress asynchronous clock domain FIFO, and counts and monitors data writing and reading out of the DDR4 AXI interface.

2. The system for implementing large-scale FIFO data processing based on DDR according to claim 1, wherein the burst read and write data block chain table carries out a data flow coherent operation under the control of a flow control state machine according to read and write signal changes of the ingress asynchronous clock domain FIFO and the egress asynchronous clock domain FIFO.

3. The system for implementing large-scale FIFO data processing based on DDR according to claim 1, wherein operating modes of the system described are a transparency transport mode and a transit transport mode, said transparency transport mode means that in a case of a short data duration and not exceeding the FIFO depths of the ingress asynchronous clock domain FIFO and the egress asynchronous clock domain FIFO, data streams are directly passed through the ingress asynchronous clock domain FIFO and the egress asynchronous clock domain FIFO for the purpose of data transmission; the transit transport mode described refers to the transit of the data streams through a buffer space of the DDR4 AXI interface in the event that a continuous data duration is long and exceeds the threshold value ingress asynchronous clock domain FIFO and egress asynchronous clock-domain FIFO of FIFO depth.

4. The system for implementing large-scale FIFO data processing based on DDR according to claim 1, wherein said system has a read bandwidth of the egress asynchronous clock domain FIFO in a transparency transport mode that is greater than the write bandwidth of the ingress asynchronous clock domain FIFO.

5. A method of implementing large-scale FIFO data processing based on DDR using the system of claim 1, wherein the method comprises the following steps:

(1) power-on reset, ingress asynchronous clock domain FIFO writes data;

(2) determine whether the ingress asynchronous clock domain FIFO written data is greater than a threshold value, if so, a working mode turns to a transit transport mode, turning on DDR4 access and using DDR4 as cache space for read and write operations; otherwise, the working mode turns to a transparency transport mode.

6. The method for implementing large-scale FIFO data processing based on DDR according to claim 5, wherein the method comprises the step of implementing a FIFO read and write operation through the transit transport mode, specifically comprises the following processing:

(1-1) the DDR4 AXI interface performs burst accesses using a data block as a unit of operation to obtain monitoring variables for a data block count value and a number of ingress FIFO data reads;

(1-2) the ingress asynchronous clock domain FIFO acquires a full length block of data;

(1-3) if a write bus of the DDR4 AXI interface is in a READY state, a write enable is issued and a internal count value is updated; if a read bus of the DDR4 AXI interface is in the READY state, a read enable is issued, summarized data is passed to the egress asynchronous clock domain FIFO, and the internal count value is updated.

7. The method for implementing large-scale FIFO data processing based on DDR according to claim 5, wherein the method comprises the step of implementing a FIFO read and write operation through the transparency transport mode, specifically comprises the following processing:

(2-1) power-on reset, an empty signal of the ingress asynchronous clock domain FIFO is high and the full signal of the egress asynchronous clock domain FIFO is low;

(2-2) write data, the empty signal of the ingress asynchronous clock domain FIFO is low, and according to a timing jump formula, a read enable of the ingress asynchronous clock domain FIFO is obtained as high;

(2-3) counts a number of data reads from the ingress asynchronous clock domain FIFO, and if the number of data reads exceeds the threshold value, a mode signal automatically jumps to the transit transport mode; otherwise, it continues to the transparency transport mode, and continues with step (2-4);

(2-4) data is read from the ingress asynchronous clock domain FIFO and written to the egress asynchronous clock domain FIFO, and the egress asynchronous clock domain FIFO write enable signal performs a timing jump according to equation;

(2-5) determine whether the ingress asynchronous clock domain FIFO is read empty or the egress asynchronous clock domain FIFO is written full; if so, no further operation is performed on the ingress asynchronous clock domain FIFO and the step is exited; otherwise, read and write operations continue to be performed on the ingress asynchronous clock domain FIFO.

8. The method for implementing large-scale FIFO data processing based on DDR according to claim 7, wherein an effective signal of the ingress asynchronous clock domain FIFO in said step (2-4) is delayed by one clock according to a state of the read enable signal of the ingress asynchronous clock domain FIFO and an acquired signal of the ingress asynchronous clock domain FIFO before jumping.

9. A device for implementing large-scale FIFO data processing based on DDR, wherein the device comprises:

processor, configured to execute computer-executable instructions;

memory, storing said computer-executable instructions, when said computer-executable instructions are executed by said processor, various steps for realizing the method of implementing large-scale FIFO data processing based on DDR as claimed in claim 5.

10. A processor for implementing large-scale FIFO data processing based on DDR, wherein a processor is configured to execute computer-executable instructions, and when said processor executes computer-executable instructions, the method of implementing large-scale FIFO data processing based on DDR as claimed in claim 5 is performed.

11. A non-transitory computer-readable storage medium having a computer program stored on it, wherein the computer program may be executed by a processor to implement the various steps for realizing the method of implementing large-scale FIFO data processing based on DDR as claimed in claim 5.

12. The system for implementing large-scale FIFO data processing based on DDR according to claim 1, wherein the flow control state machine uses a Round-Robin scheduling algorithm to achieve Round-Robin scheduling policy for data stream writes and reads to ensure data coherence and improve DDR4 interface bandwidth utilization.

* * * * *